Jan. 16, 1940.  A. S. KANE  2,187,707
LAND CLEARING MACHINE
Filed June 10, 1939  3 Sheets-Sheet 1

INVENTOR.
Archie S Kane

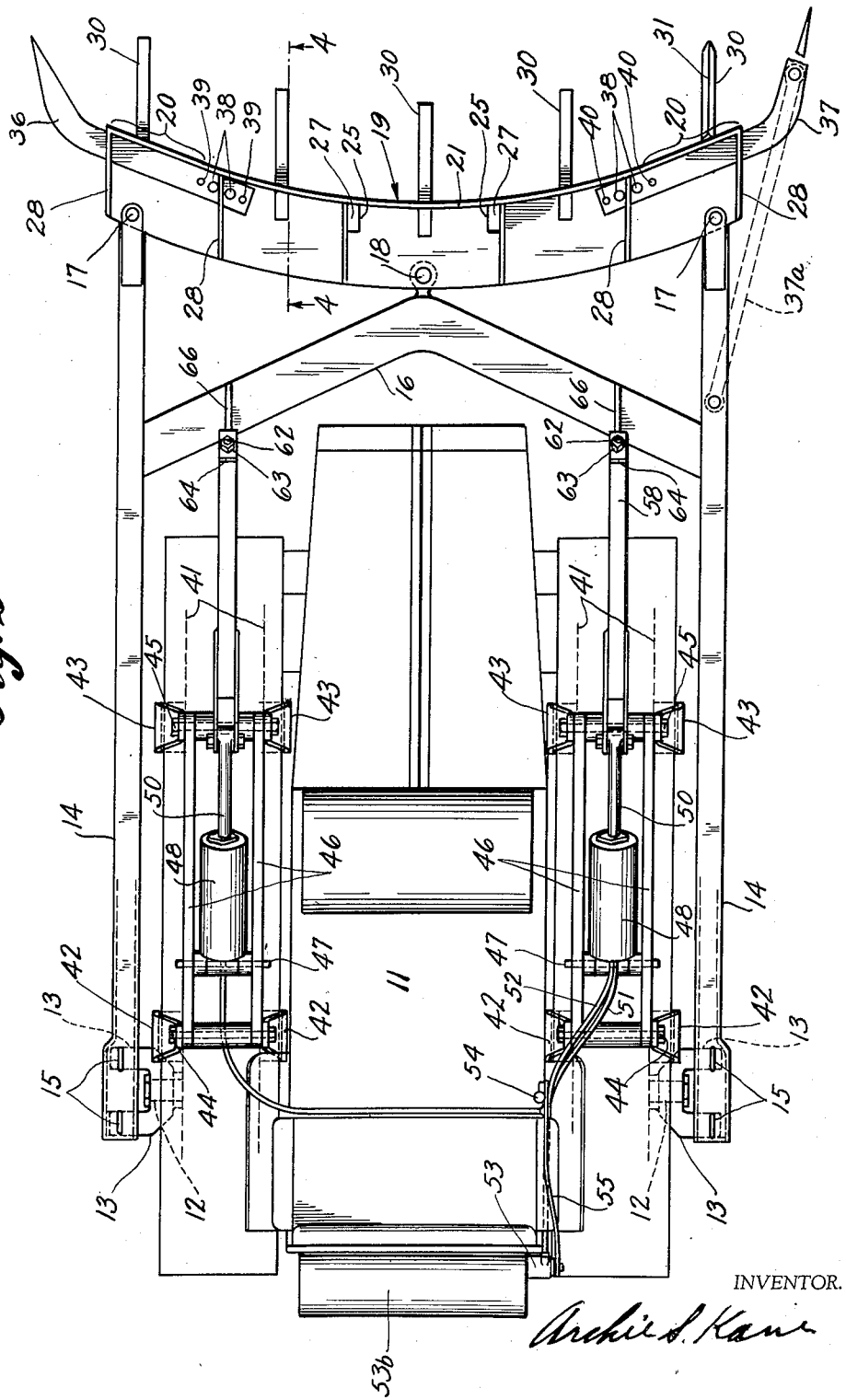

Jan. 16, 1940.                A. S. KANE                2,187,707
                        LAND CLEARING MACHINE
                    Filed June 10, 1939         3 Sheets-Sheet 3
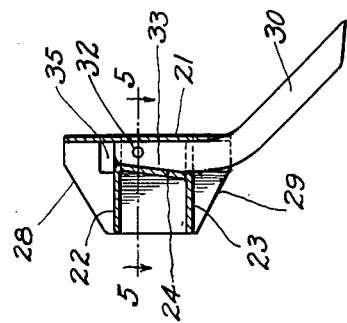
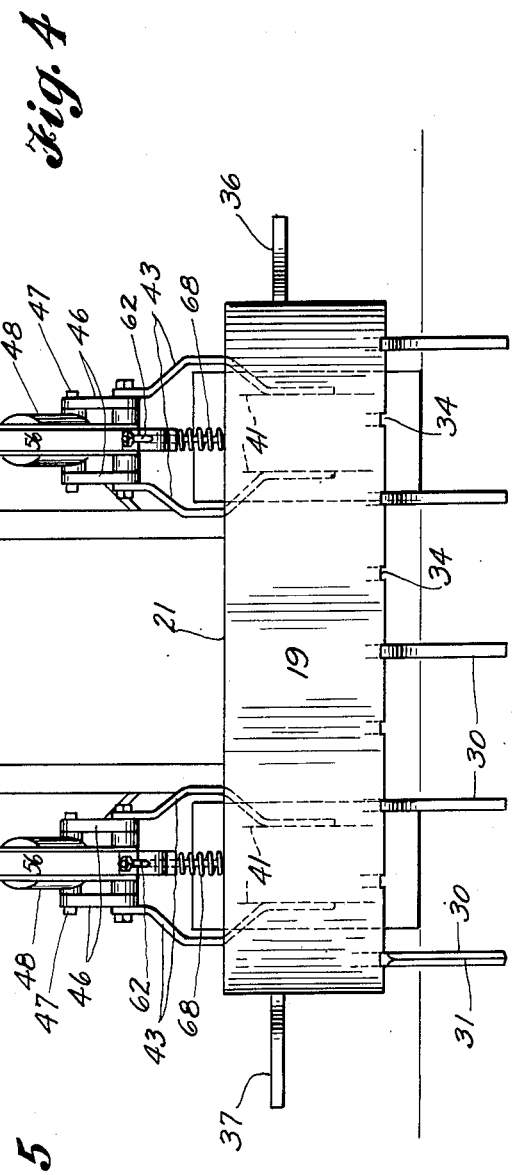
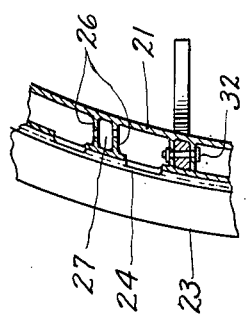
INVENTOR.
Archie S Kane Patented Jan. 16, 1940

2,187,707

UNITED STATES PATENT OFFICE 2,187,707

LAND CLEARING MACHINE

Archie S. Kane, Everett, Wash.

Application June 10, 1939, Serial No. 278,583

2 Claims. (Cl. 37—2)

This invention relates to improvements in ripping, cutting and digging equipment adaptable for use on bulldozers and like machines in the clearing of land of roots, stumps and brush.

The invention appears in providing mounting of teeth forwardly of the bulldozer, the teeth being mounted and in a manner readily removable; and in connection therewith, lateral wedge-like arms suitable for splitting trees and stumps, such arms being also adjustably mounted and may be removed readily. The teeth are so constructed that a cutting edge is formed upon the lower edge thereof for cutting of roots.

I am aware that in connection with bulldozers and the like, equipment has been in use for various purposes, such as removal of trees without injury to same, conveying and handling materials, and ripping devices for road construction. However, none of such machines are useful in land clearing, as they lack means for root cutting, stump splitting and handling of earth and other burdens arising in land clearing operations, which I provide and which appear in my invention.

There is and has been a need for a speedy and economical land clearing device which could be used in reclaiming vast areas of logged off lands and making them productive.

My invention provides such means and while in operation not only clears the land but aerates the soil, leaving it ready for cultivation.

The angle of the teeth causes them to carry roots and debris more freely to the surface and give lifting power which could not be obtained if straight teeth were used.

The curve of the blade tends to keep the logs in front of the machine.

The stump splitter will split certain types of stumps making it possible to remove them without blasting.

The stump splitter in combination with the hook on the opposite corner makes it possible to push over trees or stumps from any angle, and also gives a higher leverage for so doing.

The root cutter makes it possible to cut the roots and remove stumps and trees that would otherwise have to be blasted.

It can readily be seen that no part of this combination interferes with the workings of the whole combination and to take any part of the combination away would reduce its efficiency.

Other objects of my invention will appear in the accompanying drawings and specification, in which Fig. 1 is a side view of my machine.

Fig. 2 is a top view of my machine.

Fig. 3 is a front end view of my machine.

Fig. 4 is a section upon the line 4—4 of Fig. 2.

Fig. 5 is a section upon the line 5—5 of Fig. 4.

Figure 1:
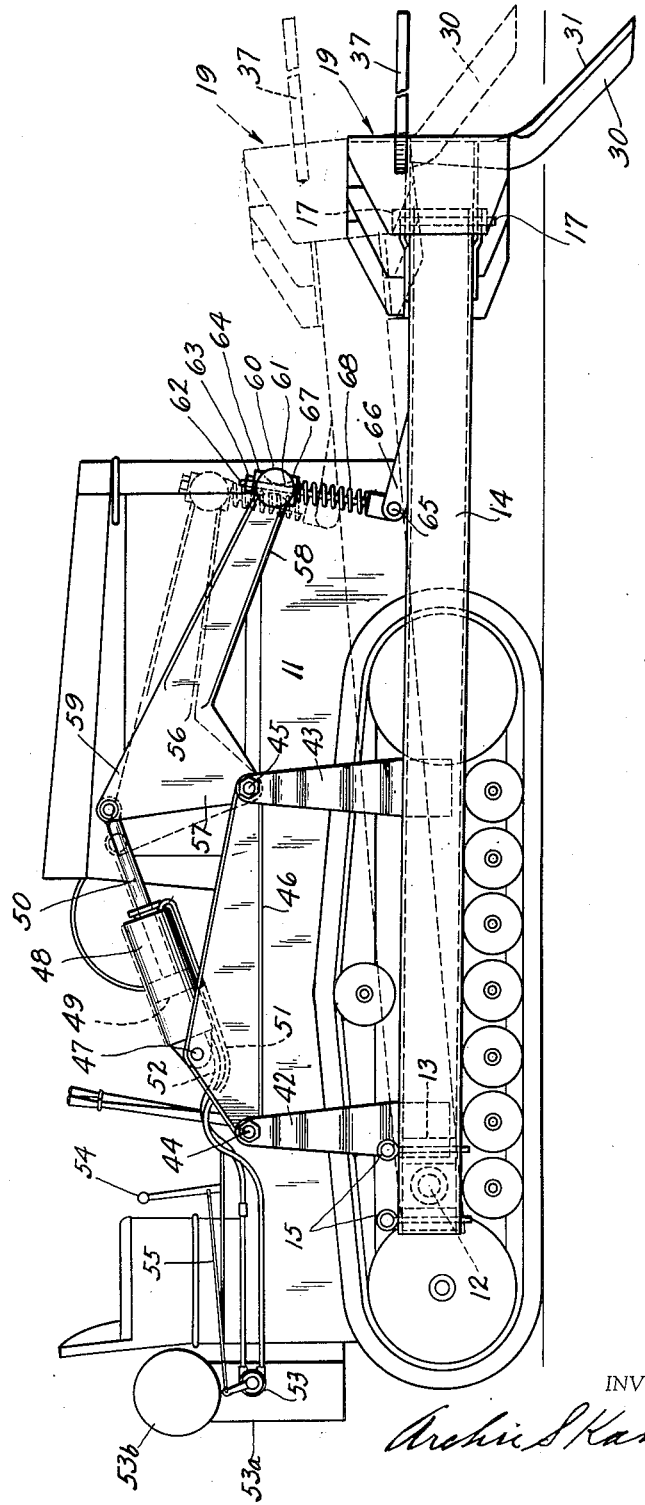

Referring more particularly to the drawings, reference numeral 11 represents the tractor which is preferably of the caterpillar type. Projecting from the side of the tractor, and secured thereto, are projecting trunnions 12 on which are rotatably mounted brackets 13. To the brackets 13 are secured two side bars 14 by means of easily removable pins 15. The side bars 14 are securely connected near their front ends by yoke 16. Connected to the front end of side bars 14 and the center portion of yoke 16 by means of pins 17 and 18 is a crossframe represented in its entirety by reference numeral 19.

The cross frame 19 is preferably of the construction shown in Figs. 2 and 4.

The plan of the frame is preferably as shown in Fig. 2, being curved throughout most of its length with a short straight portion at each end as shown at 20. The frame in construction consists of a curved front plate 21, and a top plate 22 and bottom plate 23. Welded between plates 22 and 23 is an oblique back plate 24. The front edge of top and bottom plates 22 and 23 are notched as shown at 25 (Fig. 2) and on each side of the notches and between tops and bottom plates 22 and 23 are welded side pieces 26 so as to form sockets 27 with parallel sides but shorter at the top than at the bottom as clearly shown in Fig. 4. 28 and 29 are top and bottom braces respectively to more securely unite the front plate with top 22 and bottom plate 23, and in general strengthen the entire cross frame 19.

Adaptable to be slipped into sockets 27 are hooks 30, preferably of the shape shown in Figs. 1 and 4. One or more of the hooks 30, preferably the one on the right-hand side of the machine is provided with a sharp front edge 31 for severing roots, etc. The hooks 30 are prevented from dropping out by means of pins 32 passed through holes in the side pieces 26, and holes near the top of the hooks 30. The top portion of hooks 30 are tapered as shown at 33 so as to be easily driven out of the sockets 27. The front plate 21 is notched at the bottom edge as shown at 34 (Fig. 3) to receive the shank of the hooks 30 so as to eliminate any shoulder between the bottom of the plate 21 and the hooks, to facilitate roots, debris, etc., rooted up by the hooks, to slide easily up on the front plate 20.

In the lower front corner of end braces 28 are cut holes 35 to receive the side hook 36 and the splitting wedge 37. This hook and wedge are held in place by pins 38. The hook 36 and wedge 37 have supplemental holes 39 and 40 respectively to facilitate retracting or extending the hook and wedge.

The wedge 37 may be more rigidly held in place and prevented from bending under heavy stress by means of brace 37A, shown in dotted lines Fig. 2, one end of which is secured to the wedge 37 and the other end secured to bar 14. This brace is easily detachable and may be removed at will.

Rigidly secured to the track frames 41 are pairs of upright brackets 42 and 43. Secured between the upper ends of brackets 42 and 43 by means of bolts 44 and 45 are pairs of triangular frames 46. Pivoted between each pair of triangular frames 46 by means of pivot pins 47 are the ends of hydraulic cylinders 48 fitted with oscillating pistons 49 and piston rods 50. Each end of cylinders 48 are connected by means of connecting hoses 51 and 52 to reversing valve 53. Valve 53 is operated by means of lever 54 and connecting link 55. Valve 53 connects to an oil pump which is operated by the tractor engine, and is contained in a case 53a. 53b is an oil reservoir. The pump and its connection to engine are not detailed on the drawings as is apparent, so they form no part of the invention.

56 represents bell cranks consisting of the two lever arms 57 and 58 joined at 59. The end of lever 57 is pivotly mounted on bolts 45 and the common junction 59 of levers 57 and 58 is pivoted to the outer end of piston rods 50. The outer end of lever portion 58 of the bell cranks is provided with a boss 60 provided with a vertical hole 61 thru which is passed the upper end of bolts 62, which are provided with nuts 63 and washers 64, the lower faces of which are shaped to fit the contour of the bosses 60. The lower end of bolts 62 are pivotally connected by means of pins 65 to the brackets 66 secured to the yoke 16 (Figs. 1 and 2). Disposed between the lower or head end of bolts 62 and a washer 67 fitted to the contour of boss 60 are springs 68. The object of springs 68 is to take up any sudden jar or upward movement of side bars 14 transmitted from hook 30. It will be noted that by the proper manipulation of the valve 53 (Fig. 1) that the side bars 14 and cross frame 19 with the hooks 30 may be lowered or raised as shown in the dotted lines through the action of the hydraulic cylinders 48, bell crank 56 and the connecting bolts 62.

The method of operation is as follows:

Suppose first it is desired to root up ordinary roots, small stumps, etc. The frame 19 with the hooks 30 are let down by the operation of valve 53 as previously described and the tractor run forward. The depth to which the hooks 30 are let down may be varied and held in any desired position by the amount of oil forced in or exhausted from the upper end of the cylinders 48, as will be readily noted from the cylinder hook up to the frames 19, through the medium of the piston rod 50, bell crank 56, and connecting bolt 62 to the bars 14 supporting frame 19 and hooks 30. As the tractor moves forward the roots will be loosened and will be forced up along the shanks of the hooks 30 unto the front frame 19. If the roots are large, or long and hard to loosen and lift by the tractor running forward only, they may be eased up by lifting the hooks 30.

For stumps that are too large to be rooted up by means of hooks 30 alone are first split by ramming with wedge 37 and then rooted up as just described. Very large and tough stumps may first be split by using a charge of dynamite.

Trees that are standing, if not too large, are first pushed over by means of wedge 37 or hook 36 (Fig. 2). When this method is used the frame 19 with wedge 37 and hook 36 is first raised to a suitable height to increase the leverage against the tree.

While I have shown and described a particular form of embodiment of my invention I am aware that many minor changes will readily suggest themselves to those skilled in the art without departing from the spirit and scope of my invention. I therefore desire to avoid being limited to the particular form of embodiment I have hereinabove shown and described.

Having described my invention which I claim as new and desire to protect by Letters Patent is:

1. In an apparatus of the character described, the combination with a tractor of a frame supported from and disposed forwardly of said tractor and a yoke supported on said frame, a concave mold board extending transversely substantially in a vertical plane a plurality of rooting and lifting hooks, means for adjustably fixing the shanks thereof flush with the mold board, one or more of said hooks being provided with forwardly and lateral cutting edges, splitting wedges removably and adjustably affixed to either side of the concave mold board by means of rigid shanks and means for maintaining said lateral splitting wedges in established position rigidly to said mold board and said frame.

2. A machine of the described type, comprising a tractor, a frame, attached to the tractor forwardly extended of the same, a yoke on said frame, which is adjustable relative to said tractor, a concave mold board disposed on the forward end of said frame, notched at spaced intervals to receive the shanks of a plurality of digging hooks flush with said mold board in adjustable manner, means for maintaining the hooks in position when, adjusted, one or more of said hooks being forwardly and laterally formed into cutting edges, lateral splitting wedges removably affixed to said mold board and means for holding the same rigidly in an adjusted position relative to the frame and mold board.

ARCHIE S. KANE.